United States Patent Office 3,331,792
Patented July 18, 1967

3,331,792
USE OF CERTAIN BIS(HYDROXY-ALKYLBENZYL-THIO) COMPOUNDS AS ANTIOXIDANTS
Francis X. O'Shea, Wolcott, Conn., assignor to Uniroyal, Inc., a corporation of New Jersey
No Drawing. Original application Aug. 1, 1963, Ser. No. 299,170, now Patent No. 3,260,757, dated July 12, 1966. Divided and this application Mar. 18, 1966, Ser. No. 535,309
13 Claims. (Cl. 260—2.5)

ABSTRACT OF THE DISCLOSURE

Certain bis(hydroxy-alkylbenzylthio) compounds of the type

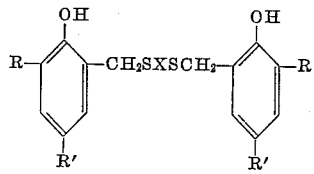

as exemplified by 1,2-bis(2-hydroxy-3-t-butyl-5-methyl benzylthio) ethane, are used as antioxidants in rubbers, plastics, oil, etc.

---

This application is a division of my copending application Ser. No. 299,170, filed Aug. 1, 1963, now U.S. Patent No. 3,260,757.

This invention is concerned with a new series of compounds which are useful as antioxidants for rubber, plastics, fats, petroleum products and other organic materials normally subject to oxidative deterioration. The compounds of this invention are derived from 2,4-disubstituted phenols and may be represented by the formula:

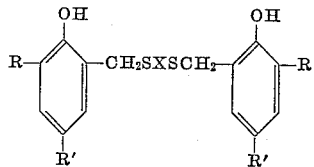

in which R and R' are alkyl, cycloalkyl or aralkyl groups of up to 12 carbon atoms each and X is a diradical containing from 2 to about 18 carbon atoms. The diradical may be aliphatic in nature or may contain cycloaliphatic or aromatic groups. The diradical may contain, in addition, hetero atoms such as sulfur, oxygen or nitrogen, as will be disclosed in more detail below.

This invention is also concerned with a novel method for preparing these compounds. This method involves the reaction of the analagous 2,4,6-trisubstituted phenol, described in more detail below, with an alkali metal hydroxide and a dithiol.

In U.S. Patents 2,322,376 (6/22/43) and 2,417,118 (3/11/47), R. F. McCleary and S. M. Roberts disclosed as new compounds useful as lubricating oil additives compounds of the type:

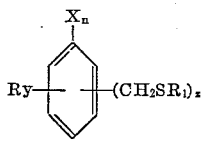

wherein R is a radical selected from the group consisting of hydrogen and a hydrocarbon radical, $R_1$ is a hydrocarbon radical, X is a substituent selected from the group consisting of hydroxyl radicals and metal substituted hydroxyl radicals and $n$, $y$ and $z$ are integers of at least one.

In U.S. Patent 2,472,318 (6/7/49), Philip Subhow disclosed the use of compounds of the type:

RSR'SR as oxidation inhibitors for lubricating oils, wherein R is one of the groups taken from the class consisting of an aryl, alkyl aryl and substituted aryl, alkyl aryl groups, S is sulfur and R' is a low molecular weight alkyl group. Among the possible structures listed was included:

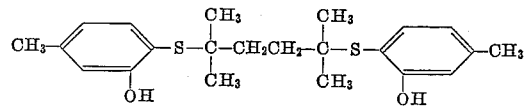

This invention differs from the prior art in the following ways:

(1) The series of compounds of this invention is previously unreported. Such compounds are herein disclosed for the first time.

(2) The compounds described by McCleary and Roberts are monocyclic phenols which contain the grouping —CH$_2$SR in which R is an alkyl group. A mercaptan is used as a reactant to prepare such a compound.

On the other hand, the compounds of this invention employ a dimercaptan as a reactant. The compounds of this invention are therefore bis-phenols linked through this difunctional reactant. This marked structural difference is pointed up by the distinctive superiority in antioxidant activity of the compounds of this invention over compounds of the type disclosed by McCleary and Roberts.

(3) The compounds of this invention differ from those proposed by Subhow which are aromatic sulfides, the sulfur atom being attached directly to the aromatic ring. The compounds of this invention, being functionally different from those proposed by Subhow, are therefore not homologous.

(4) My method of preparation of these new compounds is also novel.

The compounds of this invention may be prepared by treating two molar equivalents of a phenolic intermediate compound of the formula:

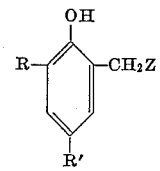

wherein Z is selected from the group consisting of a dithiocarbamyl radical of the formula

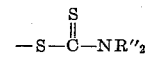

in which R" is a lower alkyl (1-4 carbon atoms) radical, and the mercaptobenzothiazolyl radical:

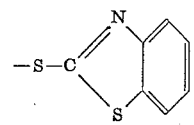

and in which R and R' are alkyl, cycloalkyl or aralkyl groups of up to 12 carbon atoms each with at least two molecular equivalents of an alkali metal hydroxide and one molecular equivalent of a dithiol of the general formula:

HSXSH in which X is a diradical containing from 2 to about 18 carbon atoms. The diradical may be aliphatic in nature or may contain cycloaliphatic or aromatic groups. The diradical may contain, in addition, hetero atoms such as sulfur, oxygen or nitrogen. Thus, for example, X may be (a) a polymethylene diradical of the formula —(CH₂)ₙ— wherein $n$ is a whole number from 2 to 12, for example —CH₂CH₂— and —(CH₂)₁₂—.

(b) a branched chain polyalkylene diradical of the formula:

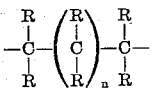

wherein $n$ is a whole number from 0 to 9 and the R groups may be hydrogen or alkyl groups and at least one of the R groups is an alkyl group, for example —CH₂—CH(CH₃)— and —CH₂—C(CH₃)₂—CH₂—.

(c) an aralkyl diradical of the formula:

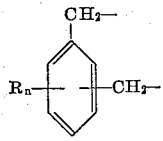

wherein R is an alkyl group of 1 to 4 carbon atoms and $n$ is a whole number from 0 to 4, for example:

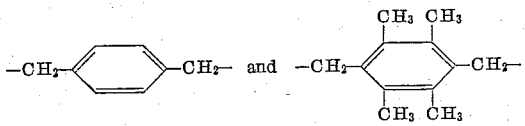

(d) aralkyl diradicals of the formulae:

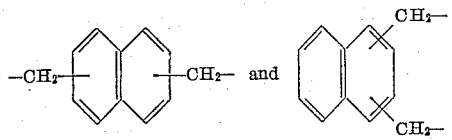

(e) an aromatic diradical of the formula:

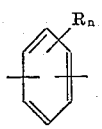

wherein R is an alkyl radical and $n$ is a whole number from 0 to 4, for example:

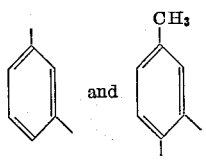

(f) an aromatic diradical of the formula:

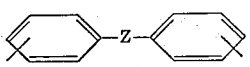

wherein Z is selected from the group consisting of —O—, —S—, —SO₂—.

(g) an aromatic diradical of the formula:

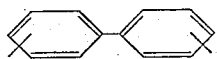

(h) a cyclic hydrocarbon containing diradical of the general formula:

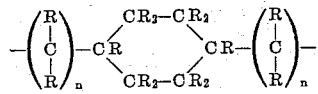

wherein R may be hydrogen or an alkyl group and $n$ is a whole number from 0 to 6, for example:

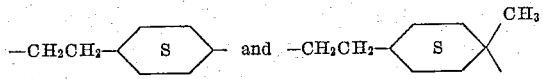

(i) an aliphatic diradical containing hetero atoms of the general formula:

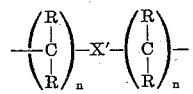

wherein R may be hydrogen or alkyl, $n$ is a whole number from 1 to 6 and X′ is selected from the group consisting of —O—, —S—, —SO₂— and —NR′— (wherein R′ is an alkyl group), for example: —CH₂CH₂OCH₂CH₂—, —CH₂CH₂SCH₂CH₂— and —CH₂CH₂SO₂CH₂CH₂—.

(j) diradicals of the formulae:

—CH₂CH₂OCH₂CH₂OCH₂CH₂— and —CH₂CH₂OCH₂OCH₂CH₂—

(k) a diradical of the formula:

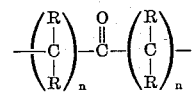

wherein R may be hydrogen or alkyl and $n$ is a whole number from 1 to 5, for example:

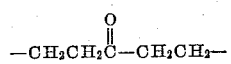

The reaction is generally carried out in a suitable water miscible solvent such as methanol, ethanol, isopropanol, dioxane, ethylene glycol dimethyl ether, etc. The reaction may be carried out from about room temperature (e.g. 20° C.) to 100° C. or more. In practice it is usually conducted at the reflux temperature of the reaction mixture which is ordinarily from about 60° C. to 100° C.

The equation for this reaction is as follows:

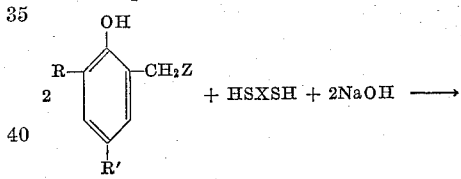

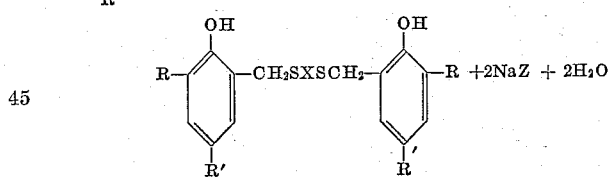

The compounds may also be prepared by a direct reaction of a 2,4-dihydrocarbyl phenol with formaldehyde and a dimercaptan under acid catalysis. A preparation of this type is described in Example #7, below. However, the present method gives a much purer product.

The phenolic intermediate compounds may be prepared in the following manner:

(a) Mercaptobenzothiazolyl methyl substituted phenols.

These intermediates may be prepared from a 2,4-dialkyl phenol by reaction with formaldehyde and mercaptobenzothiazole under acid catalysis in a reaction similar to that described by Sebrell in U.S. Patents 2,134,957 (11/1/38) and 2,150,463 (3/14/39).

The phenols which may be used include 2,4-dimethylphenol, 2-methyl-4-t-butylphenol, 2-t-butyl-4-methylphenol, 2,4-di-t-butylphenol, 2-methyl-4-cyclohexylphenol, 2-cyclohexyl-4 - methylphenol, 2,4 - dicyclohexylphenol, 2-methyl-4-t-octylphenol, 2-t-octyl-4-methylphenol, 2,4-di-t-octylphenol, 2-nonyl-4-methylphenol, 2-methyl-4-nonylphenol, 2,4-dinonylphenol, 2-methyl-4 - (alpha-methylbenzyl)phenol, 2-(alpha-methylbenzyl)-4-methylphenol, 2,4 - di(alpha-methylbenzyl)phenol, 2-methyl-4 - (alpha, alpha-dimethylbenzyl)phenol, 2-(alpha,alpha - dimethylbenzyl) - 4-methylphenol, 2,4-di - (alpha,alpha-dimethylbenzyl)phenol, etc.

(b) Dithiocarbamylmethyl substituted phenols.

These intermediates may be prepared from a 2,4-dialkyl phenol by reaction with formaldehyde, a dialkylamine and carbon disulfide in a manner similar to that described by A. F. Hardman in U.S. Patent 2,757,174 (July 31, 1956). Any dialkylamine may be used but the low molecular weight members such as dimethylamine are preferable.

Particularly preferred substituted phenols for use as intermediates in the invention are 2-hydroxy-3,5-dialkylbenzyl benzothiazolyl sulfides, 2-hydroxy-3,5-dialkylbenzyl N,N-dimethyldithiocarbamates, and 2-hydroxy-3-aralkyl-5-alkylbenzyl benzothiazolyl sulfides.

The dimercaptans (dithiols) which may be reacted with the above mentioned intermediates include the following:

(a) 1,2-ethanedithiol
    1,4-butanedithiol
    1,10-decanedithiol
(b) 2,2-dimethyl-1,3-propanedithiol
(c) alpha,alpha'-dimercapto-p-xylene
    bis(mercaptomethyl) durene
(d) bis(mercaptomethyl) naphthalene
(e) toluenedithiol
(f) p,p'-oxybis(thiophenol)
(g) dimercapto diphenyl
(h) 2-mercaptoethyl-4-mercaptocyclohexane
(i) beta,beta'-dimercaptodiethyl ether
    beta,beta'-dimercaptodiethyl sulfide
    beta,beta'-dimercaptodiethyl methylamine
(j) 1,2-bis(beta-mercaptoethoxy)ethane
(k) beta,beta'-dimercaptodiethyl ketone Particularly preferred products of the invention and those derived from dimercaptans of the formula HSXSH in which X is as defined previously and is selected from the group consisting of (I) polymethylene diradicals of the formula

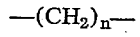

wherein $n$ is a whole number from 2 to 12;

(II) aralkyl diradicals of the formula:

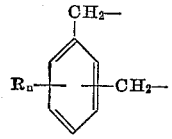

wherein R is an alkyl group of 1 to 4 carbon atoms and $n$ is a whole number from 0 to 4; and (III) aliphatic diradicals of the general formula:

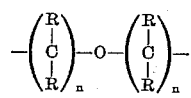

wherein R may be hydrogen or alkyl and $n$ is a whole number from 0 to 6.

Preferred products (i.e. those resulting from combination of the described preferred phenolic intermediate compounds and the described preferred dimercaptans) include bis(2-hydroxy-3-alkyl-5-alkyl benzylthio) alkanes; bis(2 - hydroxy - 3-alkyl-5 - alkyl benzylthio)alkylbenzenes [also called alpha,alpha'-bis(2-hydroxy-3-alkyl-5-alkylbenzylthio)-dialkyl benzenes]; bis(2-hydroxy-3-alkyl-5-alkyl benzylthio) dialkyl ethers; bis(2-hydroxy-3-aralkyl-5-alkyl benzylthio) alkylbenzenes [also called alpha,alpha'-bis(2-hydroxy-3 - aralkyl-5-alkylbenzylthio) dialkylbenzenes]; bis(2-hydroxy-3 - alkyl-5-alkylbenzylthio)-diphenyl ethers; bis(2-hydroxy-3-alkyl-5-alkylbenzylthio)alkyl cyclohexanes; bis(2-hydroxy-3-alkyl-5-alkylbenzylthio) dialkyl sulfides (especially diethyl sulfides); and bis(2-hydroxy-3-alkyl-5-alkylbenzylthio) biphenyls, in which the alkyl and aralkyl groups contain up to 12 carbon atoms.

Example 1

Preparation of 1,2-bis(2-hydroxy-3-t-butyl-5 - methylbenzylthio)-ethane.

2-hydroxy-3-t-butyl-5-methylbenzyl 2 - benzothiazolyl sulfide was first prepared as follows: 2-mercaptobenzothiazole (584.5 g., 3.5 moles) was suspended in one liter of isopropyl alcohol in a 3-liter, 3-neck flask equipped with a mechanical stirrer, condenser, thermometer and addition funnel. To the suspension was added 292 g. (3.6 moles) of 37% aqueous formaldehyde and the mixture was warmed to 60–70° C. for 30 minutes. 2-t-butyl-p-cresol (492 g., 3 moles) was then added followed by 100 ml. of concentrated hydrochloric acid. The mixture was then refluxed for four hours with stirring, the crystalline product beginning to precipitate out after one hour. The mixture was cooled and the product was filtered off, washed with isopropyl alcohol and dried. The yield of 2-hydroxy-3-t-butyl-5-methylbenzyl 2-benzothiazolyl sulfide was 744 g. (72%), M.P. 164–165° C.

A solution of 7 g. (0.11 mole) of potassium hydroxide (85% active) in 20 ml. of water was added to a solution of 4.7 g. (0.05 mole) of 1,2-ethanedithiol in 100 ml. of ethanol. 2-hydroxy-3-t-butyl-5-methylbenzyl 2-benzothiazolyl sulfide (34.3 g., 0.1 mole) was then added and the mixture was heated to near reflux for 15 minutes. The solution was then cooled and the crystalline product which precipitated was filtered off, washed with cold ethanol and dried. The yield of 1,2-bis(2-hydroxy-3-t-butyl-5-methylbenzylthio)ethane was 19 g. (85%), M.P. 95–96° C.

Analysis.—Calc'd: percent S=14.35. Found: percent S=14.39, 14.53.

Example 2

Preparation of alpha,alpha'-bis(2-hydroxy-3-t-butyl-5-methylbenzylthio)-p-xylene.

A solution of 6.6 g. (0.1 mole) of potassium hydroxide (85% active) in 10 ml. of water was added to 50 ml. of ethylene glycol dimethyl ether containing 8.5 g. (0.05 mole) of alpha,alpha'-dimercapto-p-xylene. 2-hydroxy-3-t-butyl-5-methylbenzyl 2-benzothiazolyl sulfide (34.3 g., 0.1 mole) was then added and the solution was heated at reflux for one hour. The solution was then poured into water and the oily organic product was extracted with ether. The ether extract was washed with water and evaporated down to a liquid residue which crystallized, wt.=25.5 g. (98%). The alpha,alpha'-bis(2-hydroxy-3-t-butyl-5-methylbenzylthio)-p-xylene was purified by recrystallization from ethanol giving 19 g. (73%) of white crystals, M.P. 109–111° C.

Analysis.—Calc'd: percent S=12.27. Found: percent S=12.34, 12.27.

Example 3

Preparation of beta-beta'-bis[2-hydroxy-3 - (1,1,3,3-tetramethylbutyl)-5-methylbenzylthio]diethyl ether.

2-hydroxy-3-(1,1,3,3,-tetramethylbutyl)-5-methylbenzyl 2-benzothiazolyl sulfide was first prepared as follows:

A mixture of 1100 g. (5 moles) of 2-(1,1,3,3-tetramethylbutyl)-p-cresol, 162 g. (5 moles) of paraformaldehyde, 835 g. (5 moles) of 2-mercaptobenzothiazole, 10 g. of p-toluenesulfonic acid and 1500 ml. of benzene was placed in a 5-liter, 3-neck flask equipped with stirrer, thermometer, Stark and Dean trap and condenser. The mixture was heated to reflux (80° C.) for six hours, during which time the water of reaction was azeotroped out and collected. A total of 90 ml. of water was collected (quantitative). The benzene was then distilled off, the last part in vacuo. The solid residue weighed 2,017 g. (quantitative) and was recrystallized from ethanol. The yield of recrystallized 2-hydroxy-3-(1,1,3,3-tetramethylbutyl)-5-methylbenzyl 2-benzothiazolyl sulfide was 1,660 g. (83%), M.P. 101–103°.

A solution of 7 g. (0.11 mole) of potassium hydroxide (85% active) in 10 ml. of water was added to 50 ml. of ethanol containing 7 g. (0.05 mole) of beta,beta'-dimercaptodiethyl ether. This solution was then added to 200 ml. of hot ethanol containing 40 g. (0.1 mole) of 2-hydroxy-3-(1,1,3,3-tetramethylbutyl) - 5 - methylbenzyl 2-benzothiazolyl sulfide. The solution was heated on a steam bath for 10 minutes and then cooled. The product crystallied out and was filtered off, washed with ethanol and dried, M.P. 99–101° C., wt. 24.8 g. (82%).

*Analysis.*—Calc'd: percent S=10.62. Found: percent S=10.47, 10.63.

Example 4

Preparation of alpha,alpha'-bis[2-hydroxy-3 - (alpha, alpha-dimethylbenzyl)-5-methylbenzylthio]-p-xylene.

2-hydroxy-3-(alpha,alpha-dimethylbenzyl)-5 - methylbenzyl 2-benzothiazolyl sulfide was first prepared as follows:

A mixture of 226 g. (1 mole) of 2-(alpha,alpha - dimethylbenzyl)-p-cresol, 33 g. (1.1 moles) of paraformaldehyde, 167 g. (1 mole) of 2-mercaptobenzothiazole, 2 g. of p-toluenesulfonic acid and 250 ml. of benzene was placed in a one-liter, 3-neck flask and refluxed for four hours. The water of reaction (16 ml.) was azeotroped out as formed and collected in a Stark and Dean trap (theory=18 ml.). The benzene solution was washed with dilute aqueous sodium hydroxide to remove unrecated 2-mercaptobenzothiazole and was then concentrated down to a liquid residue which was crystallized from benzene. The yield of 2-hydroxy-3-(alpha,alpha-dimethylbenzyl)-5-methylbenzyl 2 - benzothiazolyl sulfide was 101.5 g. (33%), M.P. 141–143° C.

81.2 g. (0.2 mole) of 2-hydroxy-3-(alpha,alpha - dimethylbenzyl)-5-methylbenzyl 2 - benzothiazolyl sulfide was reacted with 15 g. (0.22 mole) of 85% KOH (in 20 ml. of water) and 17.2 g. (0.1 mole) of alpha,alpha'-dimercapto-p-xylene in 100 ml. of ethylene glycol dimethyl ether. The product, isolated in 77% yield, had a melting point of 120–121° C.

Example 5

Use of a dithiocarbamylmethyl substituted phenol intermediate. Preparation of beta, beta'-bis[2-hydroxy-3-(1,1,3,3 - tetramethylbutyl) - 5 - methylbenzylthio]diethyl ether.

2-hydroxy-3-(1,1,3,3-tetramethylbutyl)-5-methylbenzyl N,N-dimethyldithiocarbamate was first prepared as follows:

A solution of 110 g. (0.5 mole) of 2-(1,1,3,3-tetramethylbutyl)-p-cresol, 100 g. (1.25 moles) of 37% aqueous formaldehyde and 112 g. (0.5 mole) of 25% aqueous dimethylamine in 350 ml. of methanol was refluxed for two hours. The solution was then cooled in an ice bath and the white, crystalline product was filtered off and dried. The weight of the 2-(1,1,3,3-tetramethylbutyl)-4-methyl-6-dimethylaminomethylphenol was 126 g. (91%), M.P. 43–48° C.

A portion of the Mannich base weighing 83 g. (0.3 mole) and 24 g. (0.3 mole) of carbon disulfide were combined with 100 ml. of ethylene and glycol monoethyl ether and refluxed for seven hours. The product separated as an oil and then crystallized. It was filtered off, dried and recrystallized from hexane. The yield of 2-hydroxy-3-(1,1,3,3-tetramethylbutyl)-5-methylbenzyl N,N-dimethyldithiocarbamate was 44 g. (50%), M.P. 105–107° C.

A mixture of 35.3 g. (0.1 mole) of 2-hydroxy-3-(1,1,3,3-tetramethylbutyl)-5-methylbenzyl N,N-dimethyldithiocarbamate, 6.9 g. (0.05 mole) beta,beta'-dimercaptodiethyl ether, 17.5 ml. (0.1 mole) 6 N NaOH and 60 ml. of ethylene glycol dimethyl ether was heated under reflux for 10 minutes. The solution was then poured into 200 ml. of cold water. The product separated as an oil which gradually became crystalline. The precipitate was filtered off, washed with water and dried, wt.=25 g. (83%), M.P. 98–100° C. after recrystallization from hexane.

Example 6

Preparation of beta,beta' - bis(2 - hydroxy - 3 - t - butyl-5-methylbenzylthio)diethyl ether.

A mixture of 34.3 g. (0.1 mole) of 2-hydroxy-3-t-butyl-5-methylbenzyl 2-benzothiazolyl sulfide, 6.9 g. (0.05 mole) of beta,beta'-dimercaptodiethyl ether and 150 ml. of ethanol was placed in a 500 ml. 3-neck flask fitted with a stirrer, thermometer and condenser. A solution of 4.4 g. (0.11 mole) of sodium hydroxide in 20 ml. of water was then added and the mixture was heated to reflux for 60 minutes. The solution was then poured into 500 ml. of water and the organic product which separated was extracted with hexane-ether. The extract was washed with water, dried with anhyd. potassium carbonate and evaporated to an oil which crystallized. The beta,beta'-bis(2-hydroxy-3-t-butyl-5-methylbenzylthio)diethyl ether obtained weighed 24.5 g. (quantitative), M.P. 62–64° after recrystallization from hexane.

Example 7

Preparation of beta,beta' - bis(2 - hydroxy - 3 - nonyl-5-methylbenzylthio)diethyl ether.

A mixture of 93.6 g. (0.4 mole) of 2-nonyl-p-cresol, 13 g. (0.4 mole) of paraformaldehyde, 27.6 g. (0.2 mole) of beta,beta'-dimercaptodiethyl ether, 1 g. of p-toluene sulfonic acid and 100 ml. of benzene was placed in a 500 ml. 3-neck flask fitted with a thermometer, stirrer and Stark and Dean trap with condenser. The solution was then heated to reflux and the water formed in the reaction (7 ml.) was collected in the Stark and Dean trap. The reaction was complete in about two hours. The benzene solution was then diluted with hexane, washed with aqueous sodium bicarbonate and water, and dried with anhydrous potassium carbonate. The solution was then evaporated down on a steam bath. The beta,beta'-bis(2-hydroxy-3-nonyl-5-methylbenzylthio)-diethyl ether was obtained as a viscous liquid weighing 123 g. (97%).

Example 8

Preparation of p,p'-bis(2-hydroxy-3-t-butyl-5-methylbenzylthio)diphenyl ether.

p,p'-Dimercaptodiphenyl ether (11.7 g., 0.05 mole) was dissolved in a solution of 6.6 g. (0.1 mole) of 85% potassium hydroxide in 20 ml. of 50% aqueous ethanol. This was then added to a mixture of 32.2 g. (0.094 mole) of 2-hydroxy-3-t-butyl-5-methylbenzyl 2-benzothiazolyl sulfide in 500 ml. of ethanol and the solution was heated at reflux for 30 minutes. The solution was then cooled and diluted with 100 ml. of water.

The precipitate which separated was filtered off and dried. The p,p'-bis(2-hydroxy-3-t-butyl-s-methylbenzylthio)diphenyl ether obtained weighed 24.5 g. (90%), M.P. 158–160° after recrystallization from ethanol.

Example 9

Preparation of beta(2-hydroxy-3-t-butyl-5-methylbenzylthio)ethyl - 4 - (2 - hydroxy - 3 - t - butyl - 5 - methylbenzylthio)cyclohexane.

A solution of 68.6 g. (0.2 mole) of 2-hydroxy-3-t-butyl-5-methylbenzyl 2-benzothiazolyl sulfide, 17.6 g. (0.1 mole) of beta-mercaptoethyl-4-mercaptocyclohexane, 13.2 g. (0.2 mole) of 85% potassium hydroxide in 20 ml. of water and 200 ml. of ethylene glycol dimethyl ether was heated at reflux for one hour. Some of the solvent (150 ml.) was then distilled out. The mother liquor was poured into ice water. The viscous liquid product which separated was extracted with hexane, washed with water and dried with anhyd. potassium carbonate. The hexane solution was then evaporated down and the product was obtained as a viscous liquid.

*Analysis.*—Calc'd: percent S=12.10. Found: percent S=11.94.

Example 10

Preparation of beta,beta'-bis(2-hydroxy-3-t-butyl-5-methylbenzylthio)diethyl sulfide.

2 - hydroxy - 3 - t - butyl - 5 - methylbenzyl 2 - benzothiazolyl sulfide (34.3 g., 0.1 mole) was reacted with 7.7 g. (0.05 mole) of beta,beta'-dimercaptodiethyl sulfide and 4.4 g. (0.11 mole) of sodium hydroxide in 20 ml. of water and 150 ml. of ethanol in the same way as described above for dimercaptodiethyl ether (Example 6). The product was obtained as a viscous liquid in 85% yield.

Example 11

Preparation of p,p'-bis(2-hydroxy-3-t-butyl-5-methylbenzylthio)biphenyl.

To a solution of 2.2 g. (0.01 mole) of p,p'-dimercaptobiphenyl and 1.4 g. (0.02 mole) of 85% potassium hydroxide in 10 ml. of water and 30 ml. of ethanol was added 6.9 g. (0.02 mole) of 2-hydroxy-3-t-butyl-5-methylbenzyl 2-benzothiazolyl sulfide. The mixture was heated on the steam bath for two hours. It was then poured into water and the product extracted with ether. Evaporation of the ether extract gave the product as a solid residue, M.P. 145–147° after recrystallization from hexane.

Example 12

This example demonstrates the usefulness of the compounds of this invention as antioxidants for rubber. Films prepared from a butadiene-styrene carboxylated latex and containing two parts of the antioxidant per 100 parts of rubber were placed in a 270° F. oven and observed for signs of resinification.

Antioxidant: Time to resinify, hours
- (1) None _____ 10
- (2) 2 - t - butyl-4-methyl-6-(beta-hydroxyethylthiomethyl)phenol _____ 44
- (3) 2 - octyl - 4 - methyl-6-(beta-hydroxy-ethylthiomethyl)phenol _____ 72
- (4) beta,beta' - bis(2 - hydroxy - 3 - t - butyl-5-methylbenzylthio)diethyl ether _____ 587
- (5) beta, beta' - bis(2 - hydroxy - 3 - octyl - 5-methylbenzylthio)diethyl ether _____ 683

The striking superiority of the compounds of this invention (4 and 5) over compounds of the type described by McCleary and Roberts (2 and 3) is evident.

Example 13

This example demonstrates the usefulness of the compounds of this invention as antioxidants for polyurethane foams. The compounds are effective in preventing the discoloration of the foam due to heat or light as demonstrated in the following tests.

(a) Heat aging.

Slices of a polyester based polyurethane foam containing 2 parts of the antioxidant per 100 parts of foam were placed in a circulating air oven at 290° F. for 17 hours. (Suitable foam may be prepared, for example in accordance with R. J. Ferrari et al., Ind. Eng. Chem., 50, 1041 (1958), type A in Table I. The ingredients except toluene diisocyanate, may be mixed at slow speed for 90 seconds in a wax container. The mixture may be allowed to stand for 90 seconds. The toluene diisocyanate may then be added and the formulation mixed at high speed for 20 seconds. The mixture may be poured into a metal mold and allowed to blow. It may then be cured at 100° C. for 15 minutes. The stabilizer to be tested may be dissolved or dispersed in a portion of the polyester.) The samples were then removed and the color of the samples observed.

Antioxidant: Color rating
- (1) None _____ Cream.
- (2) beta,beta' - bis(2 - hydroxy - 3-nonyl - 5 - methylbenzylthio)diethyl ether _____ Light cream.
- (3) beta,beta' - bis(2 - hydroxy - 3 - t-butyl - 5 - methylbenzylthio)diethyl ether _____ Off white.

(b) Light aging.

Foam slices were aged for various periods at room temperature on a bench top. During the aging periods, the specimens were exposed to diffuse, indirect sunlight and to direct fluorescent light. The samples were observed for the development of color.

| Antioxidant | Color Rating | | |
|---|---|---|---|
| | Initial | 3 weeks | 6 weeks |
| (1) None | White | Lt. yellow | Yellow. |
| (2) Beta,beta'-bis(2-hydroxy-3-nonyl-5-methylbenzylthio)diethyl ether. | Off white | Cream | Lt. yellow. |
| (3) Beta,beta'-bis(2-hydroxy-3-t-butyl-5-methylbenzylthio)diethyl ether. | White | Off white | Lt. cream. |

In general, the chemicals of the invention may be used as antioxidants in organic materials normally subject to oxidative deterioration, especially rubbers, whether natural or synthetic, particularly diolefin polymers, e.g. polybutadiene, polyisoprene, copolymers of butadiene with styrene, acrylonitrile, vinyl pyridine or other monomers, copolymers of isoprene with isobutylene or other monomers, as well as ethylene-propylene rubbery polymers, whether saturated or unsaturated (e.g. terpolymers of ethylene, propylene and dicyclopentadiene or 1,4-hexadiene), polyurethanes, blends of rubbers with plastics (e.g. mixtures of styrene-acrylonitrile resin with butadiene-acrylonitrile rubber), graft copolymers (e.g. graft copolymers of styrene and acrylonitrile on polybutadiene), various plastics such as polyvinyl chloride, polystyrene, polyethylene, polypropylene; similarly, animal fat, fish oil, vegetable fat, petroleum products (fuels, lubricating oils and greases) may be protected from oxidation.

Having thus described my invention, what I claim and desire to protect by Letters Patent is:

1. A composition comprising an organic material normally subject to oxidative deterioration, containing, in amount sufficient to protect the said material against oxidation, a chemical of the formula:

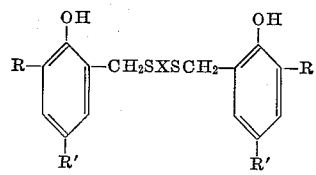

in which R and R' are selected from the group consisting of alkyl, cycloalkyl, and aralkyl groups of up to 12 carbon atoms and X is a diradical containing 2 to 18 carbon atoms, the said diradical X being selected from
 (a) polymethylene diradicals of the formula —(CH$_2$)$_n$— wherein $n$ is a whole number from 2 to 12;
 (b) branched chain polyalkylene diradicals of the formula:

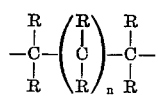

wherein $n$ is a whole number from 0 to 9 and the R groups may be hydrogen or alkyl and at least one of the R groups is an alkyl group;

(c) an aralkyl diradical of the formula:

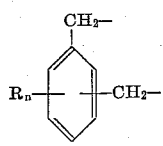

wherein R is an alkyl group of 1 to 4 carbon atoms and n is a whole number from 0 to 4;

(d) aralkyl diradicals of the formulae:

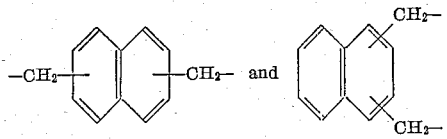

(e) aromatic diradicals of the formula:

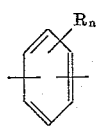

wherein R is an alkyl radical and n is a whole number from 0 to 4;

(f) aromatic diradicals of the formula:

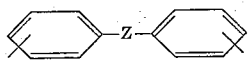

wherein Z is —O— or —S—;

(g) the aromatic diradical of the formula:

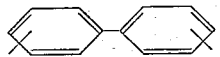

(h) cyclic hydrocarbon containing diradicals of the formula:

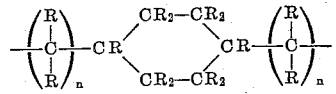

wherein R is hydrogen or an alkyl group and n is a whole number from 0 to 6;

(i) aliphatic diradicals containing hetero atoms of the formula:

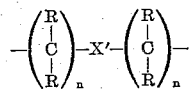

wherein R is hydrogen or alkyl, n is a whole number from 1 to 6 and X' is —O— or —S—; and (j) diradicals of the formulae:

—CH$_2$CH$_2$OCH$_2$CH$_2$OCH$_2$CH$_2$— and
—CH$_2$CH$_2$OCH$_2$OCH$_2$CH$_2$—

2. A composition as in claim 1 in which the said material is a rubber.

3. A composition as in claim 1 in which the said material is a polyurethane foam.

4. A composition as in claim 1 in which the said chemical is bis(2 - hydroxy - 3 - alkyl - 5 - alkylbenzylthio) alkane.

5. A composition as in claim 1 in which the said chemical is 1,2-bis(2-hydroxy-3-t-butyl-5-methylbenzylthio) ethane.

6. A composition as in claim 1 in which the said chemical is bis(2-hydroxy-3-alkyl-5-alkylbenzylthio) alkylbenzene.

7. A composition as in claim 1 in which the said chemical is alpha,alpha'-bis(2-hydroxy-3-t-butyl-5-methylbenzylthio)p-xylene.

8. A composition as in claim 1 in which the said chemical is bis(2-hydroxy-3-alkyl-5-alkylbenzylthio)dialkyl ether.

9. A composition as in claim 1 in which the said chemical is beta,beta'-bis[2-hydroxy-3-(1,1,3,3-tetramethylbutyl)-5-methylbenzylthio]diethyl ether.

10. A composition as in claim 1 in which the said chemical is beta,beta'-bis(2-hydroxy-3-t-butyl-5-methylbenzylthio)diethyl ether.

11. A composition as in claim 1 in which the said chemical is beta,beta'-bis(2-hydroxy-3-nonyl-5-methylbenzylthio)diethyl ether.

12. A composition as in claim 1 in which the said chemical is bis(2-hydroxy-3-alkyl-5-alkylbenzylthio) diphenyl ether.

13. A composition as in claim 1 in which the said chemical is p,p'-bis(2-hydroxy-3-t-butyl-5-methylbenzylthio)diphenyl ether.

References Cited
UNITED STATES PATENTS

| | | | |
|---|---|---|---|
| 2,976,324 | 3/1961 | Long et al. | 260—45.95 |
| 3,065,275 | 11/1962 | Goddard | 260—45.95 |
| 3,234,177 | 2/1966 | Van Schooten | 260—45.95 |
| 3,252,911 | 5/1966 | Orloff | 260—45.95 X |

FOREIGN PATENTS 842,271  8/1960  Great Britain.

DONALD E. CZAJA, *Primary Examiner.*

LEON J. BERCOVITZ, *Examiner.*

H. E. TAYLOR, *Assistant Examiner.*

Notice of Adverse Decision in Interferences

In Interference No. 96,345 involving Patent No. 3,331,792, F. X. O'Shea, USE OF CERTAIN BIS (HYDROXY-ALKYLBENZYLTHIO) COMPOUNDS AS ANTIOXIDANTS, final judgment adverse to the patentee was rendered Aug. 21, 1969, as to claims 1 and 2.

[*Official Gazette October 28, 1969.*]

UNITED STATES PATENT OFFICE
CERTIFICATE OF CORRECTION

Patent No. 3,331,792                                  July 18, 1967

Francis X. O'Shea

It is certified that error appears in the above identified patent and that said Letters Patent are hereby corrected as shown below:

In the heading to the printed specification, lines 7 and 8, "now Patent No. 3,260,757, dated July 12, 1966" should read -- now Patent No. 3,299,147, dated Jan. 17, 1967 --. Column 1, line 30, "3,260,757" should read -- 3,299,147 --.

Signed and sealed this 30th day of December 1969.

(SEAL)
Attest:

Edward M. Fletcher, Jr.                        WILLIAM E. SCHUYLER, JR.
Attesting Officer                                    Commissioner of Patents